(12) United States Patent
Choi

(10) Patent No.: US 7,102,545 B2
(45) Date of Patent: Sep. 5, 2006

(54) SIMULTANEOUS BIDIRECTIONAL INPUT/OUTPUT CIRCUIT

(75) Inventor: Jung-Hwan Choi, Kyungki-Do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 596 days.

(21) Appl. No.: 10/379,781

(22) Filed: Mar. 4, 2003

(65) Prior Publication Data

US 2004/0059845 A1   Mar. 25, 2004

(30) Foreign Application Priority Data

Sep. 25, 2002   (KR)   ................. 10-2002-0058120

(51) Int. Cl.
| | | |
|---|---|---|
| H03M 5/02 | (2006.01) | |
| H03K 5/22 | (2006.01) | |
| H03K 5/153 | (2006.01) | |
| G06G 7/12 | (2006.01) | |
| G06G 7/26 | (2006.01) | |

(52) U.S. Cl. .................. 341/56; 327/74; 327/563
(58) Field of Classification Search ................. 341/56, 341/155, 159, 161; 326/21, 82, 30, 86, 32, 326/71; 327/108, 74, 55, 535, 563; 365/52, 365/189.07; 375/242; 324/765
See application file for complete search history.

(56) References Cited

U.S. PATENT DOCUMENTS

| | | | | |
|---|---|---|---|---|
| 4,752,766 | A * | 6/1988 | Shimizu et al. | 341/159 |
| 4,849,661 | A * | 7/1989 | Bazes | 326/71 |
| 5,034,964 | A * | 7/1991 | Khan et al. | 375/242 |
| 5,276,361 | A * | 1/1994 | Bartlett | 327/535 |
| 5,283,761 | A * | 2/1994 | Gillingham | 365/189.07 |
| 5,793,680 | A * | 8/1998 | Okajima | 365/189.05 |
| 6,127,849 | A * | 10/2000 | Walker | 326/86 |
| 6,144,218 | A * | 11/2000 | Smith et al. | 326/32 |
| 6,317,352 | B1 | 11/2001 | Halbert et al. | 365/52 |
| 6,407,588 | B1 * | 6/2002 | Baker | 327/55 |
| 6,417,776 | B1 * | 7/2002 | Tagishi | 340/635 |
| 6,452,429 | B1 * | 9/2002 | Lim | 327/108 |
| 6,522,160 | B1 * | 2/2003 | Zivanovic | 324/765 |
| 6,545,510 | B1 * | 4/2003 | Cowles | 327/74 |
| 6,801,080 | B1 * | 10/2004 | Arcus | 327/563 |

(Continued)

FOREIGN PATENT DOCUMENTS

EP    0 504 060 A1   9/1992

(Continued)

OTHER PUBLICATIONS

English language abstract of European Publication No. EP 0 504 060 A1, no date.

(Continued)

*Primary Examiner*—Patrick Wamsley
(74) *Attorney, Agent, or Firm*—Marger Johnson & McCollom, P.C.

(57) ABSTRACT

Disclosed is a data detector for detecting data placed on a bi-directional data channel having two nodes. The data on the data channel is a combination of data placed on the data channel at both nodes. The data detector at the first node compares data received from the data channel to multiple reference voltages. Which reference voltages are used for comparison is determined by the state of data placed on the data channel at the first node. By comparing the data from the data channel to more than one reference voltage data can be detected with a swing margin of about 50%, such that it is less affected by noise, power or other glitches than are conventional circuits. Methods of detecting data are also disclosed.

40 Claims, 8 Drawing Sheets

U.S. PATENT DOCUMENTS

| | | | |
|---|---|---|---|
| 6,844,840 B1 * | 1/2005 | Melanson | 341/161 |
| 6,891,491 B1 * | 5/2005 | Nakamura et al. | 341/155 |
| 6,963,218 B1 * | 11/2005 | Alexander et al. | 326/30 |
| 2002/0041193 A1 | 4/2002 | Tamura et al. | |

FOREIGN PATENT DOCUMENTS

| | | |
|---|---|---|
| FR | 2 746 946 A1 | 3/1997 |
| JP | 10-154925 * | 6/1998 |

OTHER PUBLICATIONS

English language abstract of French Publication No. FR 2 746 946 A1, no date.

Jackson, Scott A. and Blalock, Benjamin J., "A CMOS Mixed Signal Simultaneous Bidirectional Signal I/O" Circuits and Systems, Aug. 9, 1998, pp. 37-40, XP010327696, IEEE Comput., Soc., USA, ISBN: 0-8186-8914-5.

* cited by examiner ial No. 2002-58120, filed Sep. 25, 2002 in the# SIMULTANEOUS BIDIRECTIONAL INPUT/OUTPUT CIRCUIT This application claims priority from Korean Patent Application No. 2002-58120, filed Sep. 25, 2002 in the Korean Intellectual Property Office, which is incorporated herein by reference for all purposes.

BACKGROUND OF THE INVENTION

1. Field of the Invention

This disclosure relates to a simultaneous bi-directional input/output (I/O) circuit for simultaneously transmitting and receiving data and a data reproduction method using the simultaneous bi-directional I/O circuit.

2. Description of the Related Art

A simultaneous bi-directional I/O system can simultaneously transmit and receive data on a single data bus line. Accordingly, the data bandwidth of such a system is substantially double that of a conventional, unidirectional system.

FIG. 1 is a schematic block diagram of a data transmission system 100 having two conventional simultaneous bi-directional I/O circuits. Referring to FIG. 1, the data transmission system 100 includes a first 10 and second 60 simultaneous bi-directional I/O circuits, which share a system bus line 50. The first simultaneous bi-directional I/O circuit 10 includes a first output buffer 20a and a first input buffer 40a, while the second simultaneous bi-directional I/O circuit 60 includes a second output buffer 20b and a second input buffer 40b.

The first output buffer 20a drives data Dout1 received from a pad 11 to the system bus line 50. The first input buffer 40a has four input terminals, Dout1, Din1, Vref1, and Vref2, as well as an output terminal Out1. The first input buffer 40a accepts the input signal Din1 from the system bus line 50, and, depending on a logic state (i.e. HIGH or LOW) of the data Dout1 from the pad 11, the first input buffer 40a accepts either a first reference voltage Vref1 or accepts a second reference voltage Vref2. The first input buffer 40a compares the received data Din1 to the received first or second reference voltage Vref1 or Vref2 and also detects data Dout2, which is driven by the second output buffer 20b.

The second output buffer 20b drives the data Dout2 received from a pad 11' to the system bus line 50. The second input buffer 40b receives either data Din2 on the system bus line 50 and the first reference voltage Vref1 or receives the data Din2 on the system bus line 50 and the second reference voltage Vref2, depending on the logic state (e.g., HIGH or LOW) of the data Dout2 from the pad 11'. The second input buffer 40b compares the received data Din2 to the received first or second reference voltage Vref1 or Vref2 and detects the data Dout1 that was driven by the first output buffer 20a. The levels of the data Din1 and data Din2 on the system bus line 50 are determined according to the output signals of the first and second output buffers 20a and 20b.

FIG. 2 is a timing diagram illustrating the operation of the data transmission system 100 of FIG. 1. Here, the first reference voltage Vref1 is set to be about 75% of the swing of the received data Dout1 and Dout2, and the second reference voltage Vref2 is set to be about 25% of the swing of the received data Dout1 and Dout2.

Referring to FIGS. 1 and 2, first, if the data Dout1 and Dout2 at the pads 11 and 11', respectively, are in a logic HIGH state, the first and second input buffers 40a and 40b use the first reference voltage Vref1 as the reference voltage for comparison. Since the output signals of the first and second output buffers 20a and 20b are logic high, the voltages Din1 and Din2 on the system bus line 50 are also logic high. This is illustrated in timeslice A of FIG. 2.

The first and second input buffers 40a and 40b amplify the difference between the logic-HIGH voltage Din1 on the system bus line 50 and the first reference voltage Vref1 and between the logic-HIGH voltage Din2 on the system bus line 50 and the first reference voltage Vref1, respectively, to detect data OUT1 and OUT2, respectively, as illustrated in FIG. 2

On the other hand, if the data Dout1 from the pad 11 is logic HIGH, and the data Dout2 from the pad 11' is logic LOW, as illustrated in timeslice B of FIG. 2, the first input buffer 40a sets the first reference voltage Vref1 as the reference voltage, and the second input buffer 40b sets the second reference voltage Vref2 as the reference voltage. In this case, the combined voltages Din1 and Din2 on the system bus line 50 have a middle value Vmid, which is between a data HIGH voltage Vh and a data LOW voltage Vl. The first input buffer 40a amplifies the difference between the voltage Din1 (=Vmid) on the system bus line 50 and the first reference voltage Vref1 (=0.75 Vh) to detect data OUT1 (=Dout2), which is LOW and driven by the second output buffer 20b.

Meanwhile, the second input buffer 40b amplifies the difference between the voltage Din2 (=Vmid) on the system bus line 50 and the second reference voltage Vref2 (=0.25 Vh) to detect data OUT2 (=Dout1), which is HIGH and is driven by the first output buffer 20a.

The operation of the first and/or second conventional simultaneous bi-directional I/O circuits 10 and 60 depending on the state of each of the data Dout1 and Dout2, as illustrated in the remaining timeslices C–E is easily understandable by one of ordinary skill in the art.

One problem with conventional simultaneous bi-directional I/O circuits 10 and 60 is that they have a swing margin of data reading (between the reference voltage and the voltage on the system bus line 50) of only about 25%.

Embodiments of the invention address these and other limitations of the prior art.

DETAILED DESCRIPTION OF THE INVENTION

Embodiments of the invention include a bi-directional I/O circuit that includes three reference voltages, VrefL, VrefM, and VrefH, having values roughly equal to 25%, 50%, 75%, respectively, of the range of voltages that will be sensed on the system bus line. The configuration of such bi-directional I/O circuits allows signals sensed on the system bus line to be compared to reference voltages such that the voltage to which they are compared has a larger margin than prior circuits. This allows the bi-directional communication system to detect data faster and more precisely than conventional circuits.

Figure 1:
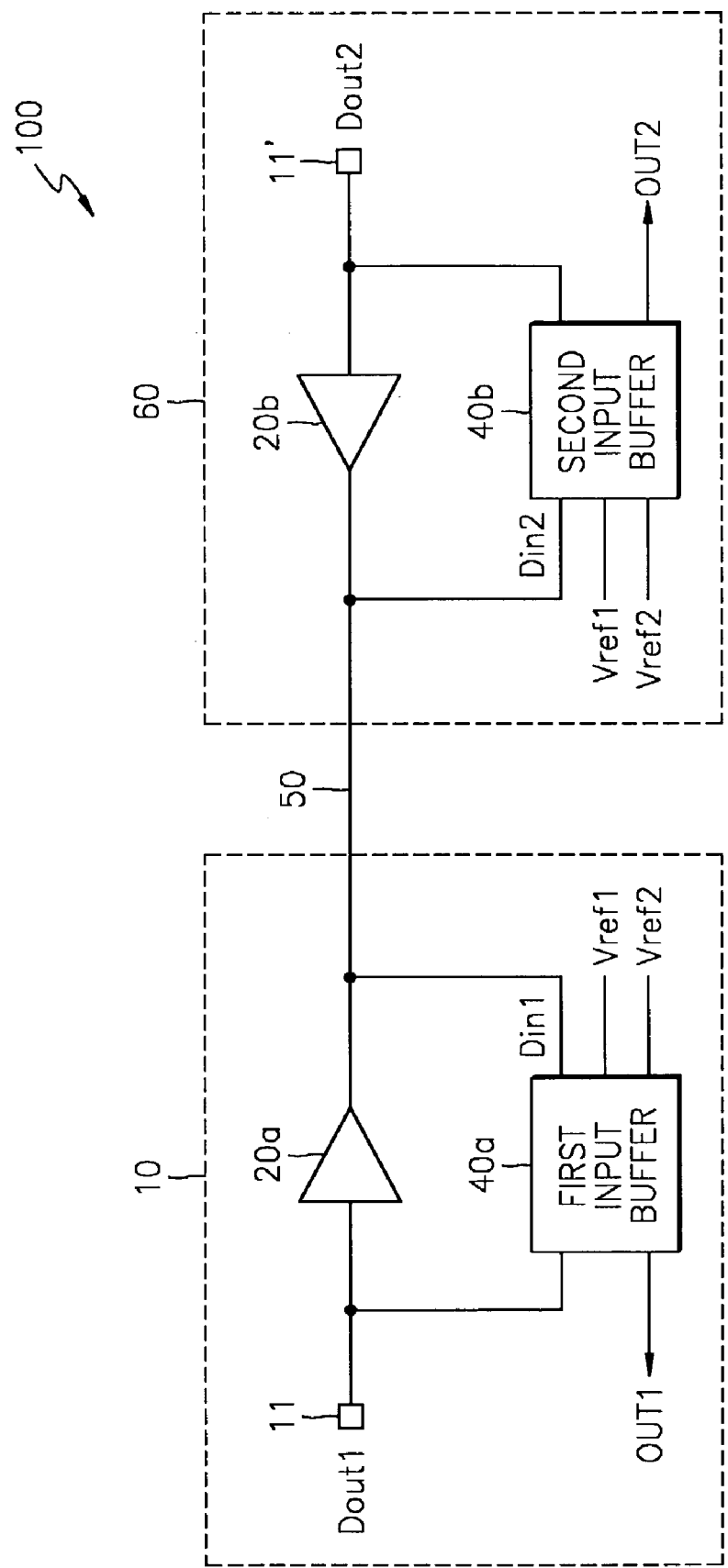
FIG. 1 is a schematic block diagram of a data transmission system having two conventional simultaneous bi-directional I/O circuits.
Figure 2:
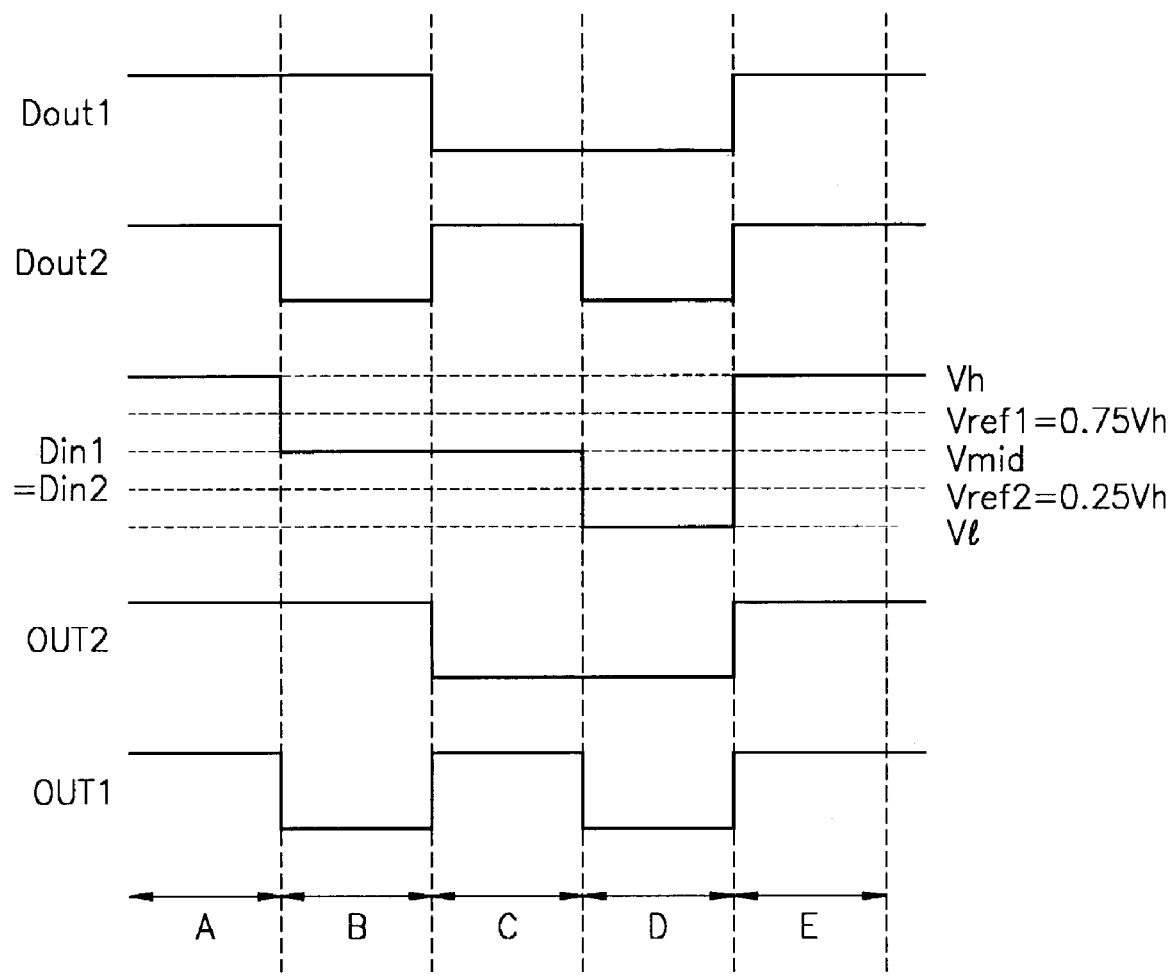
FIG. 2 is a timing diagram illustrating the operation of the data transmission system of FIG. 1.
Figure 3:
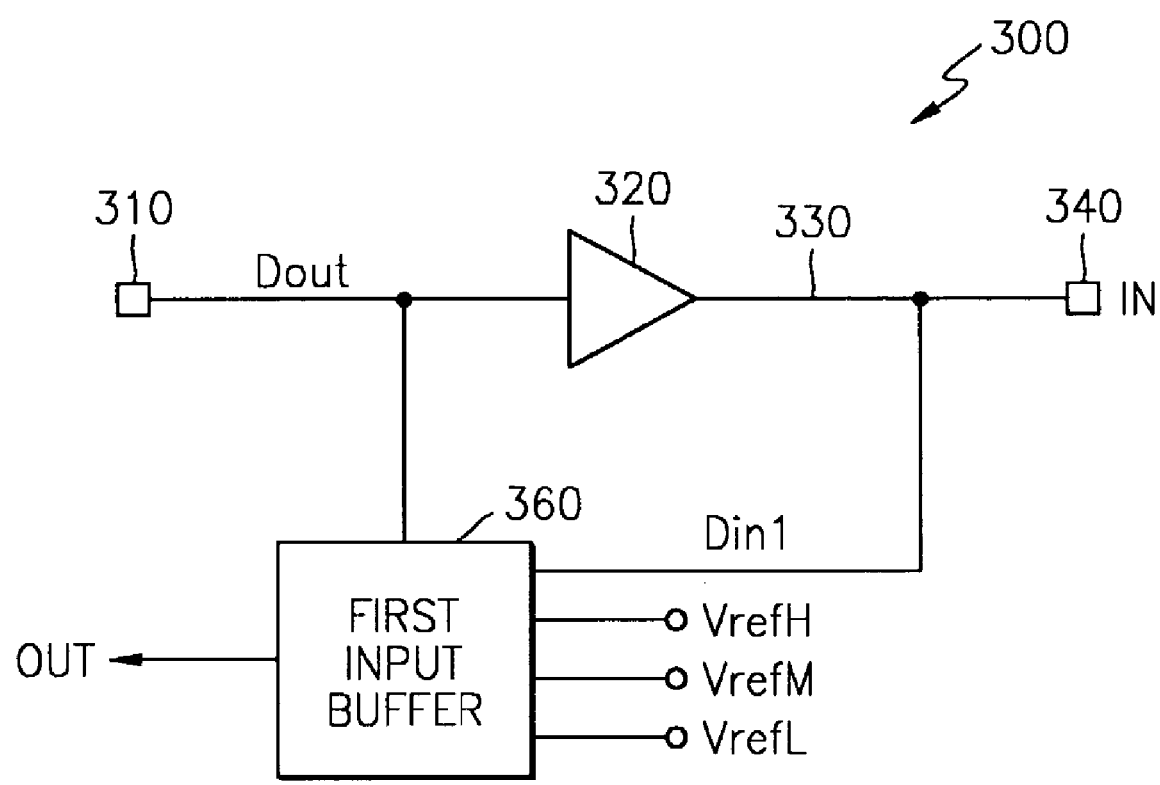
FIG. 3 is a schematic block diagram of a simultaneous bi-directional I/O circuit according to an embodiment of the present invention.

FIG. 3 is a schematic block diagram of a simultaneous bi-directional I/O circuit according to an embodiment of the present invention. Referring to FIG. 3, a simultaneous bi-directional I/O circuit 300 includes an output buffer 320 and an input buffer 350. The output buffer 320 is connected between a bus line 330 and an input terminal 310. The output buffer 320 receives a to-be-transmitted output signal Dout from the input terminal 310, buffers the received signal, and then transmits the resultant signal to the bus line 330. The to-be-transmitted output signal Dout is either logic HIGH or logic LOW.

The input buffer 350 is connected between the bus line 330 and the input terminal 310, and accepts three voltage reference inputs, VrefL, VrefM, and VrefH. The input buffer 350 compares a signal Din1 from the bus line 330, which is also coupled to a pad 340 from an external source of the simultaneous bi-directional I/O circuit 300, to a pair of reference voltages VrefH and VretM or to a pair of reference voltages VrefM and VrefL. Based on the comparison, the input buffer produces an output signal at an output terminal OUT1 that reproduces the input signal IN received from the pad 340. The selection of two reference voltages VrefH and VrefM or VrefM and VrefL from the three reference voltages VrefH, VrefM, and VrefL depends on the logic state (HIGH or LOW) of the to-be-transmitted output signal Dout, which was received from the input terminal 310.

Figure 4:
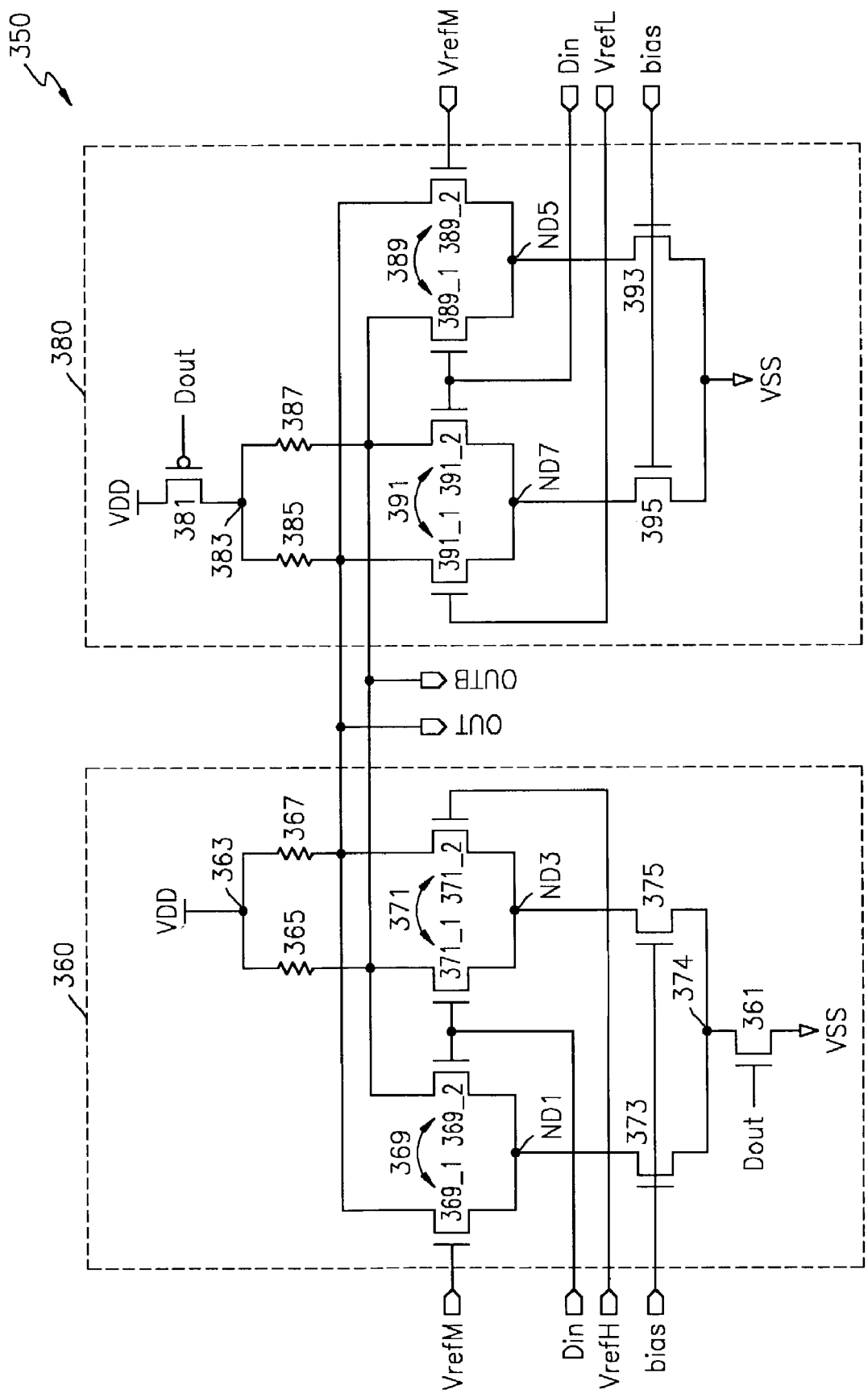
FIG. 4 is a first circuit diagram of the input buffer of FIG. 3.

As illustrated in the more detailed schematic view of FIG. 4, the input buffer 350 includes first 360 and second 380 signal detection circuits coupled in parallel between the input terminal 310 (Dout) and the bus line 330 (OUT). In response to the to-be-transmitted output signal Dout having a first logic state (e.g., HIGH), the first signal detection circuit 360 amplifies the difference between the voltage of the signal Din on the bus line 330 and the first reference voltage VrefH or between the voltage of the signal Din on the bus line 330 and the second reference voltage VrefM, and outputs the amplification result to the first and second output terminals OUT and OUTB.

The second signal detection circuit 380 of the input buffer 350 includes first and second output terminals that are coupled to the first and second output terminals OUT and OUTB, respectively, of the first signal detection circuit 360. In response to the to-be-transmitted output signal Dout having a second logic state (e.g., LOW), the second signal detection circuit 380 amplifies the difference between the voltage of the signal Din on the bus line 330 and the second reference voltage VrefM, or between the voltage of the signal Din on the bus line 330 and the third reference voltage VrefL. Preferably, each of the first and second signal detection circuits 360 and 380 is implemented by differential amplifiers.

The first reference voltage VrefH is defined as a HIGH level of the input data IN, the third reference voltage VrefL is defined as a LOW level of the input data IN, and the second reference voltage VrefM is between VrefL and VrefH, or, more specifically, is defined as half of the sum of the first and third reference voltages VrefH and VrefL. It is preferable that the second reference voltage VrefM is a one-half of the possible swing of the input data IN, that is, VrefM=(VrefH+VrefL)/2.

The first signal detection circuit 360 in the input buffer 350 includes differential amplifiers 369 and 371, a plurality of NMOS transistors 361, 373, and 375, and resistors 365 and 367. The NMOS transistor 361 is coupled between a node 374 and a ground reference voltage VSS, and receives the to-be-transmitted output signal Dout at its gate. The resistor 365 is coupled between a node 363 and the second output terminal OUTB, and the resistor 367 is coupled between the node 363 and the first output terminal OUT.

An NMOS transistor 369_1 in the differential amplifier 369 is coupled between the first output terminal OUT and a node ND1 and receives the second reference voltage VrefM at its gate. An NMOS transistor 369_2 in the differential amplifier 369 is coupled between the second output terminal OUTB and the node ND1 and receives the voltage Din on the bus line 330 at its gate.

An NMOS transistor 371_1 in the differential amplifier 371 is coupled between the second output terminal OUTB and a node ND3 and receives the voltage Din on the bus line 330 at its gate. An NMOS transistor 371_2 in the differential amplifier 371 is coupled between the first output terminal OUT and the node ND3 and receives the first reference voltage VrefH at its gate.

The NMOS transistor 373 is coupled between the node ND1 and the ground voltage VSS and receives a bias voltage "bias" at its gate. The NMOS transistor 375 is coupled between the node ND3 and the ground voltage VSS and receives the bias voltage "bias" at its gate.

The second signal detection circuit 380 in the input buffer 350 includes differential amplifiers 389 and 391, a plurality of MOS transistors 381, 393, and 395, and resistors 385 and 387. It is similarly coupled as the signal detection circuit 360. Specifically, the PMOS transistor 381 is coupled between a power supply voltage VDD and a node 383 and receives the to-be-transmitted output signal Dout at its gate. The resistor 385 is coupled between the node 383 and the first output terminal OUT, and the resistor 387 is coupled between the node 383 and the second output terminal OUTB.

An NMOS transistor 389_1 in the differential amplifier 389 is coupled between the second output terminal OUTB and a node ND5 and receives the voltage Din on the bus line 330 at its gate. An NMOS transistor 389_2 in the differential amplifier 389 is coupled between the first output terminal OUT and the node ND5 and receives the second reference voltage VrefM at its gate.

An NMOS transistor 391_1 in the differential amplifier 391 is coupled between the first output terminal OUT and a node ND7 and receives the third reference voltage VrefL at its gate. An NMOS transistor 391_2 in the differential amplifier 391 is coupled between the second output terminal OUTB and the node ND7 and receives the voltage Din on the bus line 330 at its gate.

The NMOS transistor 393 is coupled between the node ND5 and a ground voltage VSS and receives a bias voltage "bias" at its gate. The NMOS transistor 395 is coupled between the node ND7 and the ground voltage VSS and receives the bias voltage "bias" at its gate.

Figure 5:
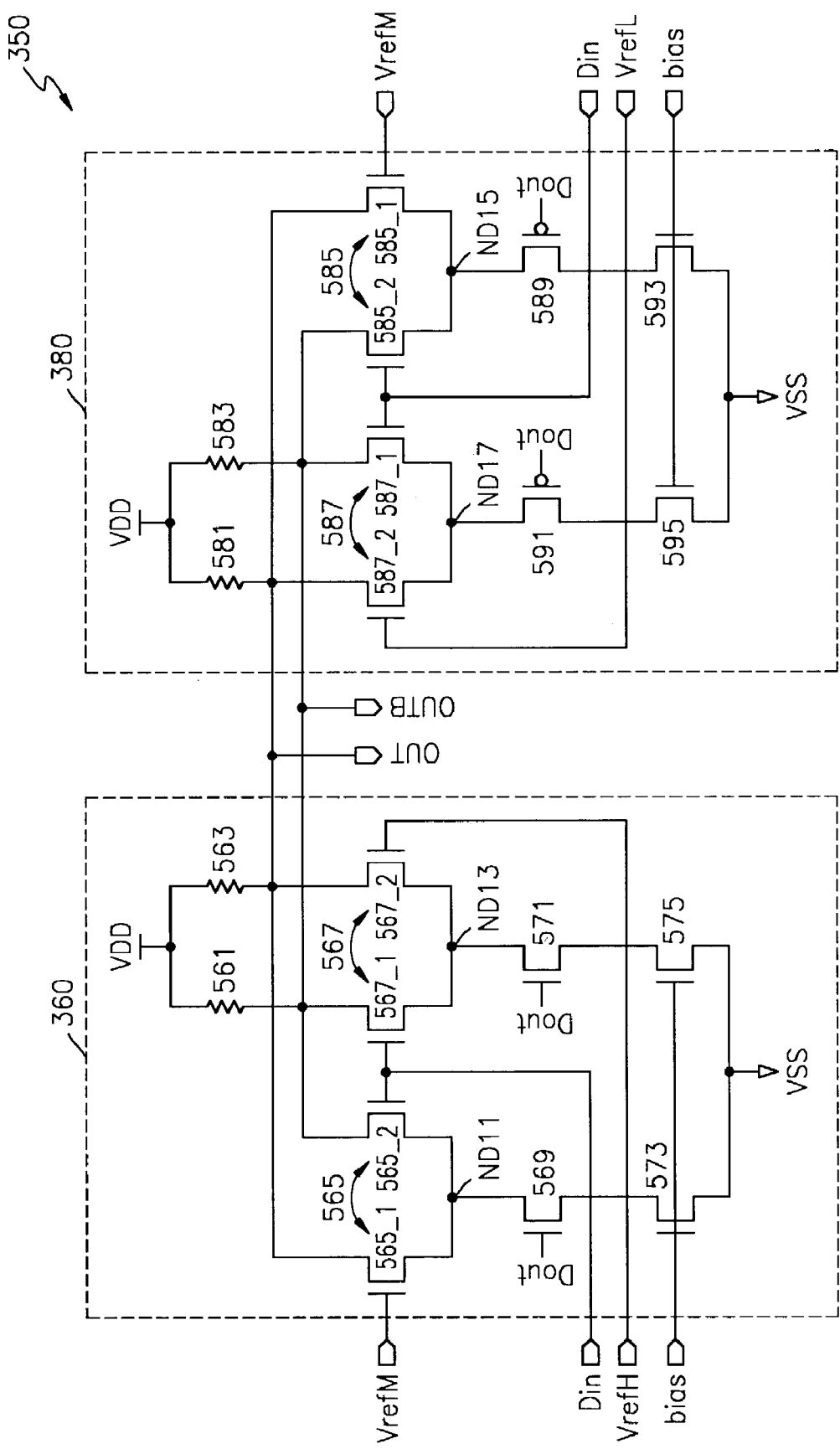
FIG. 5 is a second circuit diagram of the input buffer of FIG. 3.

FIG. 5 is a second circuit diagram illustrating another way to implement the input buffer 350 of FIG. 3. Referring to FIG. 5, the first signal detection circuit 360 in the input buffer 350 includes differential amplifiers 565 and 567, a plurality of NMOS transistors 569, 571, 573, and 575, and resistors 561 and 563.

The resistor 561 is coupled between a power supply voltage VDD and the second output terminal OUTB, and the resistor 563 is coupled between the power supply voltage VDD and the first output terminal OUT.

An NMOS transistor 565_1 in the differential amplifier 565 is coupled between the first output terminal OUT and a node ND11 and receives the second reference voltage VrefM at its gate. An NMOS transistor 565_2 in the differential amplifier 565 is coupled between the second output terminal OUTB and the node ND11 and receives the voltage Din on the bus line 330 at its gate.

An NMOS transistor 567_1 in the differential amplifier 567 is coupled between the second output terminal OUTB and a node ND13 and receives the voltage Din on the bus line 330 at its gate. An NMOS transistor 567_2 in the differential amplifier 567 is coupled between the first output terminal OUT and the node ND13 and receives the first reference voltage VrefH at its gate.

The node ND11 is coupled to the ground voltage VSS via the NMOS transistors 569 and 573, which are serially coupled together. The to-be-transmitted output signal Dout is applied to the gate of the NMOS transistor 569, and the bias voltage "bias" is applied to the gate of the NMOS transistor 573.

The node ND13 is coupled to the ground voltage VSS through the NMOS transistors 571 and 575, which are serially coupled together. The to-be-transmitted output signal Dout is applied to the gate of the NMOS transistor 571, and the bias voltage "bias" is applied to the gate of the NMOS transistor 575.

The second signal detection circuit 380 in the input buffer 350 includes differential amplifiers 585 and 587, a plurality of MOS transistors 589, 591, 593, and 595, and resistors 581 and 583.

The resistor 581 is coupled between the power supply voltage VDD and the first output terminal OUT, and the resistor 583 is coupled between the power supply voltage VDD and the second output terminal OUTB.

An NMOS transistor 585_1 in the differential amplifier 585 is coupled between the first output terminal OUT and a node ND15, and receives the second reference voltage VrefM at its gate. An NMOS transistor 585_2 in the differential amplifier 585 is coupled between the second output terminal OUTB and the node ND15, and receives the voltage Din on the bus line 330 at its gate.

An NMOS transistor 587_1 in the differential amplifier 587 is coupled between the second output terminal OUTB and a node ND17 and receives the voltage Din on the bus line 330 at its gate. An NMOS transistor 587_2 in the differential amplifier 587 is coupled between the first output terminal OUT and the node ND17 and receives the third reference voltage VrefL at its gate.

The node ND15 is coupled to the ground voltage VSS through the MOS transistors 589 and 593, which are serially coupled together. The to-be-transmitted output signal Dout is applied to the gate of the PMOS transistor 589, and the bias voltage "bias" is applied to the gate of the NMOS transistor 593.

The node ND17 is coupled to the ground voltage VSS through the MOS transistors 591 and 595, which are serially coupled together. The to-be-transmitted output signal Dout is applied to the gate of the PMOS transistor 591, and the bias voltage "bias" is applied to the gate of the NMOS transistor 595.

The buffer 350 illustrated in FIG. 5 operates with the same signals as described above with reference to FIG. 4. The difference between these two embodiments is the placement of structures within the device.

Figure 6:
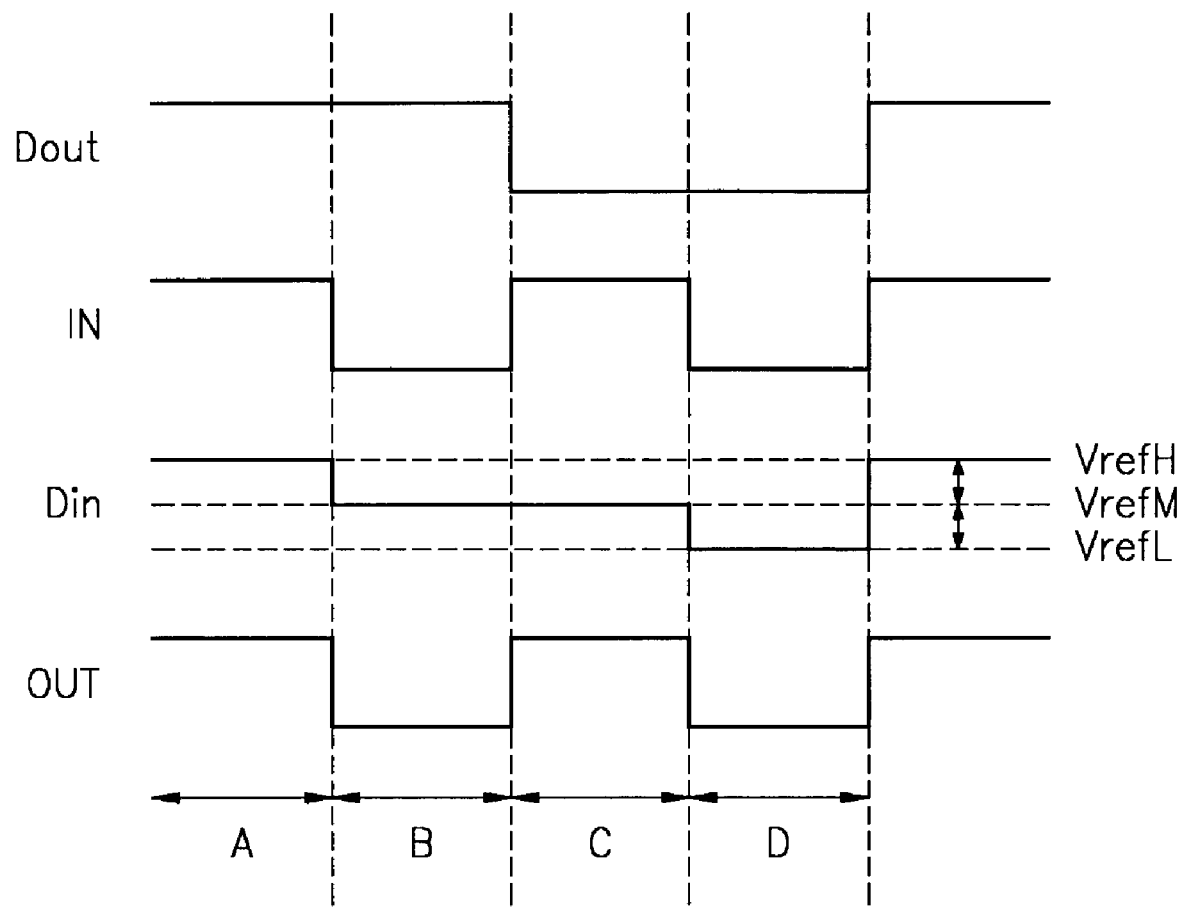
FIG. 6 is a timing diagram illustrating the operation of the simultaneous bi-directional I/O circuit of FIG. 3.

FIG. 6 is a timing diagram illustrating the operation of the simultaneous bi-directional I/O circuit of FIG. 3. The operation of the simultaneous bi-directional I/O circuit 300 of FIG. 3 will now be described with reference to FIGS. 3, 4, and 6. Here, it is presumed that the bias voltage "bias" is HIGH.

In timeslice A, because the to-be-transmitted output signal Dout received from the input terminal 310 is logic HIGH, the first signal detection circuit 360 is activated, and the second signal detection circuit 380 is inactivated. Due to the operation of the transistors 361 and 381, the to-be-transmitted output signal Dout is used as a selection signal to activate either the first signal detection circuit 360 or the second signal detection circuit 380.

If the input signal IN, which is received from the outside of the simultaneous bi-directional detection circuit 300 from the pad 340, is logic HIGH, the level of the signal Din on the bus line 330 is the same as that of the first reference voltage VrefH. Accordingly, the differential amplifier 369 amplifies the difference between the voltage Din on the bus line 330 and the second reference voltage VrefM, and outputs amplified differential signals to the first and second output terminals OUT and OUTB. The differential amplifier 371 is also operative, but, because both inputs to the amplifier 371 have the same input level (Din, which is equal to VrefH, and the signal VrefH itself), the output of the amplifier 372 will not affect the output of the differential amplifier 369. Here, the output signal for the first output terminal OUT is in a logic HIGH state, as is illustrated in timeslice A of FIG. 6.

In timeslice B, the to-be-transmitted output signal Dout has a logic HIGH level, and the input signal IN has a logic LOW level. Hence, the voltage Din on the bus line 330 is the same as the middle level of the sum of the logic HIGH level and the logic LOW level, that is, the second reference voltage VrefM. Because Dout is still HIGH, the first signal detection circuit 360 is still active. Accordingly, the differential amplifier 371 amplifies the difference between the voltage Din (=VrefM) on the bus line 330 and the first reference voltage VrefH, and outputs amplified differential signals to the first and second output terminals OUT and OUTB. The inputs to differential amplifier 369 are both equal to VrefM, so amplifier 369 does not affect the output lines OUT and OUTB. Here, the output signal for the first output terminal OUT is in a logic LOW state.

In timeslice C, the to-be-transmitted output signal Dout has a logic LOW level, and the input signal IN has a logic HIGH level. Because Dout is LOW, the first signal detection circuit 360 is inactivated, and the second signal detection circuit 380 is activated, due to the operation of the transistors 361 and 381. As illustrated in timeslice C of FIG. 6, the voltage level of the signal Din on the bus line 330 is the middle value of the sum of the logic LOW level of the to-be-transmitted output signal Dout and the logic HIGH level of the input signal IN, that is, the second reference voltage VrefM.

Accordingly, the differential amplifier 391 amplifies the difference between the voltage Din (=VrefM) on the bus line 330 and the third reference voltage VrefL, and outputs amplified differential signals to the first and second output terminals OUT and OUTB. As in the above examples, the differential amplifier 389 does not affect the outputs to the output terminals OUT and OUTB, because inputs to the amplifier 389 have no differential. Here, the output signal on the first output terminal OUT has a logic HIGH level.

As illustrated in timeslice D of FIG. 6, the to-be-transmitted output signal Dout has a logic LOW level, and the input signal IN also has a logic LOW level. Because Dout is LOW, the first signal detection circuit 360 is inactivated, and the second signal detection circuit 380 is activated. The voltage level of the signal Din on the bus line 330 becomes the third reference voltage VrefL, which is logic low, because both the signals Dout and IN are LOW.

Accordingly, the differential amplifier 389 amplifies the difference between the voltage Din (=VrefL) on the bus line 330 and the second reference voltage VrefM and outputs amplified differential signals to the first and second output terminals OUT and OUTB. As above, the differential amplifier 391 has no effect on the output signals of the differential amplifier 389. Here, the first output signal on the first output terminal OUT has a logic LOW level.

The operation of the simultaneous bi-directional I/O circuit 300 based on FIGS. 3, 5, and 6 is the same as that of the simultaneous bi-directional I/O circuit 300 based on FIGS. 3, 4, and 6, which has been already described above. Therefore, operation with reference to those figures will not be described in detail.

As illustrated above, the simultaneous bi-directional I/O circuit 300 according to embodiments of the invention can detect the input data IN with a 50% swing margin. In other words, for each combination of signals input to the I/O circuit 300, at least one of the differential amplifiers in the input buffer 350 is comparing the input signal IN to a voltage reference that is either 50% above or 50% below the value of IN.

Figure 7:
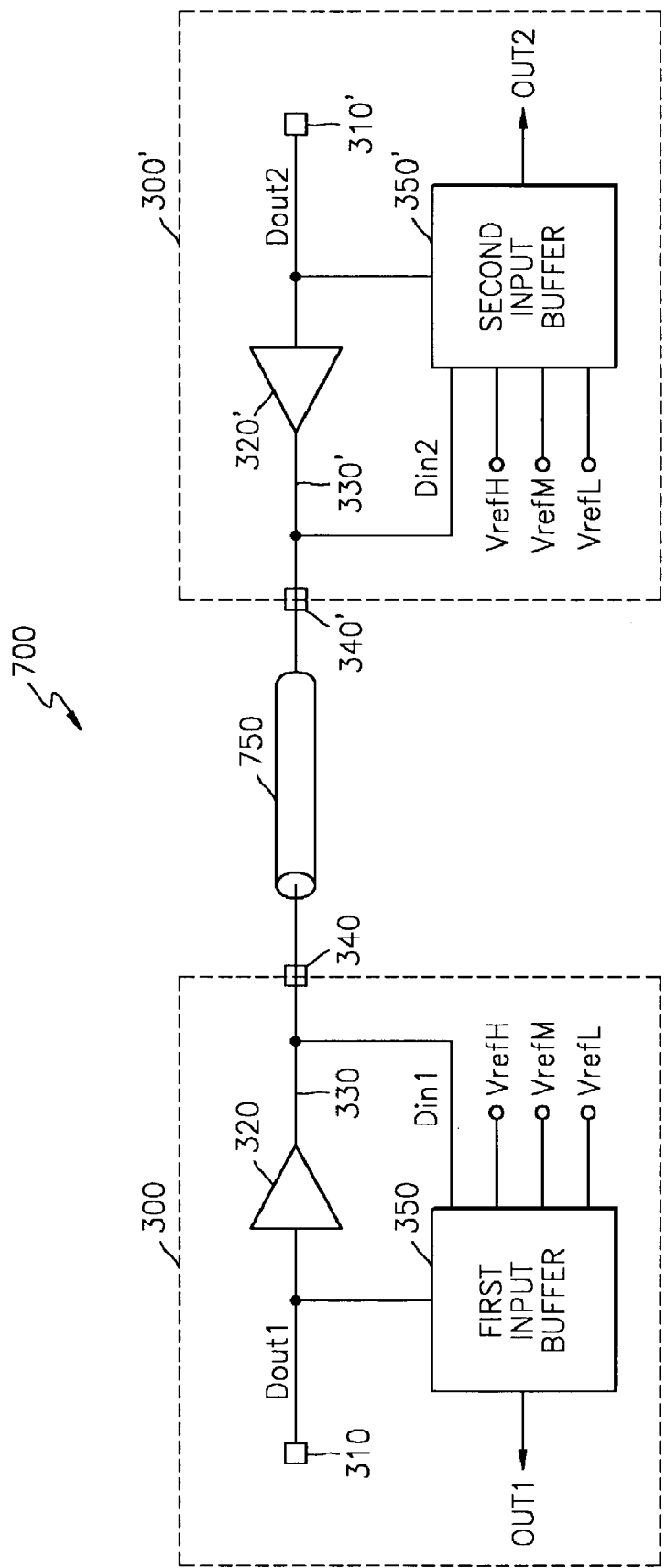
FIG. 7 is a schematic block diagram of a data transmission system including a simultaneous bi-directional I/O circuit according to embodiments of the present invention.

FIG. 7 is a schematic block diagram of a data transmission system including two simultaneous bi-directional I/O circuits 300 according to an embodiment of the present invention. Referring to FIG. 7, the data transmission system 700 includes a first simultaneous bi-directional I/O circuit 300, a second simultaneous bi-directional I/O circuit 300', and a system bus line (or channel) 750 connecting the two I/O circuits. The I/O circuits 300, 300' can be formed in separate semiconductor devices.

The semiconductor devices that house the I/O circuits 300, 300' can each include multiple simultaneous bi-directional I/O circuits that are connected to other I/O circuits in one or more semiconductor devices. In operation, the simultaneous bi-directional I/O circuits can be connected in parallel so that they transmit data to and receive data from each other in parallel over other corresponding system bus lines.

However, for convenience, FIG. 7 only shows the first and second simultaneous bidirectional I/O circuit 300 and 300' and one system bus line 750.

The first simultaneous bi-directional I/O circuit 300 includes a first output buffer 320 and a first input buffer 350, and the second simultaneous bi-directional I/O circuit 300' includes a second output buffer 320' and a second input buffer 350'. The structure and operation of the second simultaneous bi-directional I/O circuit 300' are the same as those of the simultaneous bi-directional I/O circuit 300 of FIG. 3.

Figure 8:
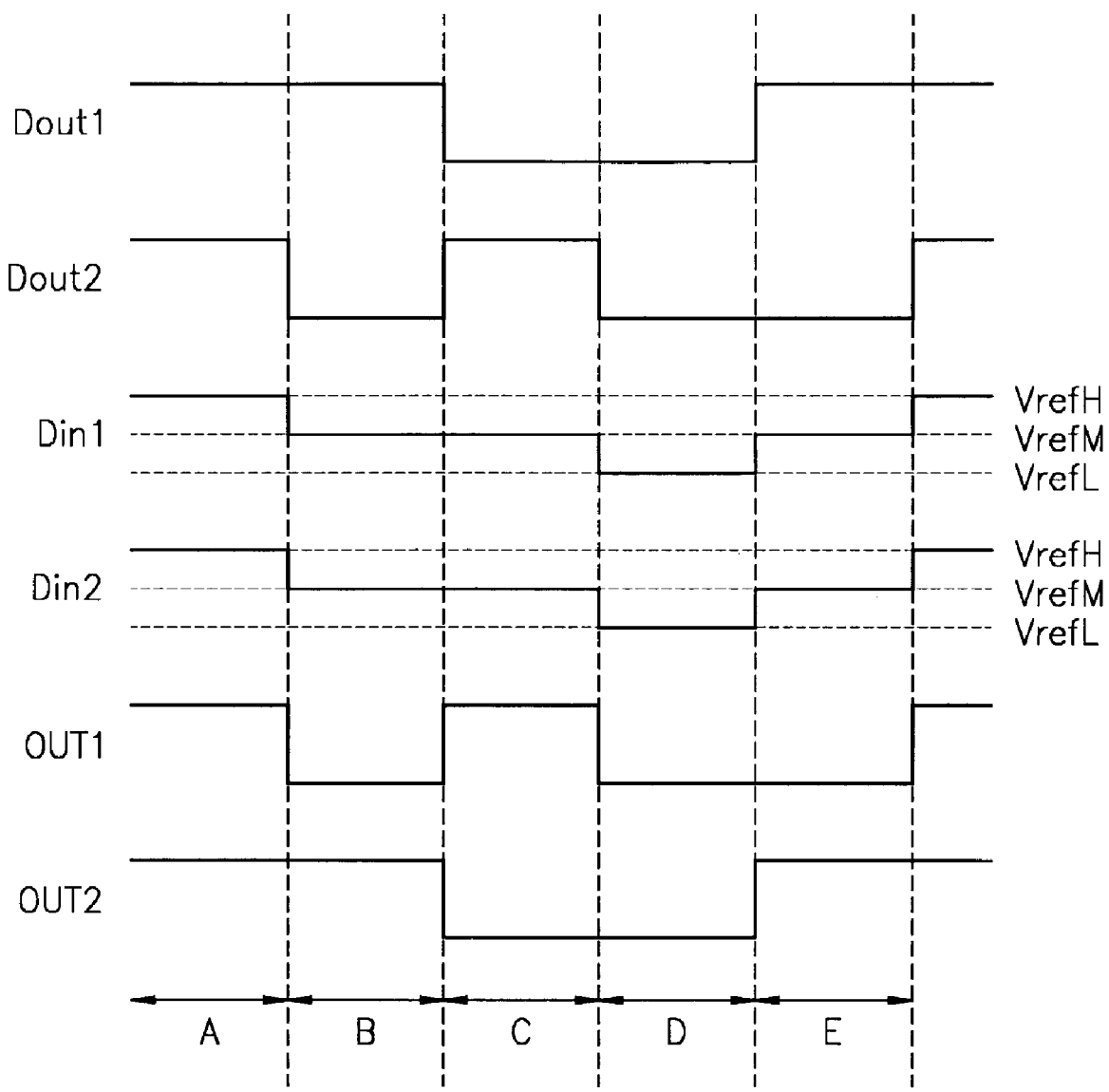
FIG. 8 is a timing diagram illustrating the operation of the data transmission system of FIG. 7.

FIG. 8 is a timing diagram illustrating the operation of the data transmission system that is illustrated in FIG. 7. The operation of the data transmission system 700 will now be described with reference to FIGS. 4, 7, and 8.

First, if data Dout1 received from the pad 310 and data Dout2 received from the pad 310' are in logic HIGH states, as illustrated in timeslice A of FIG. 8, the first and second output buffers 320 and 320' output the logic-HIGH data Dout1 and Dout2 to corresponding bus lines 330 and 330', respectively.

As described with reference to FIG. 4, because Dout1 and Dout2 are both HIGH, the first signal detection circuit 360 of each of the first and second input buffers 350 and 350' is activated, and the second signal detection circuit 380 of each of the first and second input buffers 350 and 350' is inactivated. Accordingly, the first input buffer 350 receives the second reference voltage VrefM and data Din1 on the bus line 330, amplifies the difference between them, and detects data OUT1 (=Dout2) in the logic HIGH state. The second input buffer 350' receives the second reference voltage VrefM and data Din2 on the bus line 330', amplifies the difference between them, and detects data OUT2 (=Dout1) in the logic HIGH state.

If the data Dout1 received from the pad 310 is in a logic HIGH state and the data Dout2 received from the pad 310' is in a logic LOW state, as illustrated in timeslice B of FIG. 8, the levels of the data Din1 and Din2 on the bus lines 330 and 330', respectively, have the middle value of the logic HIGH level and the logic LOW level.

The first and second signal detection circuits 360 and 380 of the first input buffer 350 are activated and inactivated, respectively, based on the to-be-transmitted signal Dout1. Accordingly, the first input buffer 350 receives the first reference voltage VrefH and the data Din1 on the bus line 330, amplifies the difference between them, and detects the data OUT1 (=Dout2) in the logic LOW state output from the second output buffer 320'.

The first and second signal detection circuits 360 and 380 of the second input buffer 350' are inactivated and activated, respectively. Accordingly, the second input buffer 350' receives the third reference voltage VrefL and the data Din2 on the bus line 330', amplifies the difference between them, and detects the data OUT2 (=Dout1) in the logic HIGH state output from the first output buffer 320.

If the data Dout1 received from the pad 310 is in a logic LOW state and the data Dout2 received from the pad 310' is in a logic HIGH state, as illustrated in timeslice C of FIG. 8, the levels of the data Din1 and Din2 on the bus lines 330 and 330', respectively, have the middle value of the logic HIGH level and the logic LOW level. That is, Din1=Din2=(Dout1+Dout2)/2.

As described with reference to FIG. 4, the first and second signal detection circuits 360 and 380 of the first input buffer 350 are activated. Accordingly, the first input buffer 350 receives the third reference voltage VrefL and the data Din1 on the bus line 330, amplifies the difference between them, and detects the data OUT1 (=Dout2) in the logic HIGH state output from the second output buffer 320'.

The first and second signal detection circuits 360 and 380 of the second input buffer 350' are activated and inactivated, respectively. Accordingly, the second input buffer 350' receives the first reference voltage VrefH and the data Din2 on the bus line 330', amplifies the difference between them, and detects the data OUT2 (=Dout1) in the logic LOW state output from the first output buffer 320.

The operation of the first and second simultaneous bi-directional I/O circuits 300, 300' in the remaining timeslices D, E, and F of FIG. 8 is as described with reference to FIGS. 3, 4, and 6.

Accordingly, a system including simultaneous bi-directional I/O circuits according to embodiments of the present invention detects input data with a swing margin of about 50%, such that it is less affected by noise, power or other glitches than are conventional circuits. As described above, each input signal is detected with a swing margin of about 50% by using combinations of three reference voltages and a to-be-transmitted output signal.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A data detector for detecting data placed on a bi-directional data channel by a first data generating device, the data detector comprising:
    a first input for accepting a signal of a logic state that a second data generating device placed on the data channel;
    a second input for accepting a present signal on the data channel;
    a first reference voltage indicative of a logic HIGH signal on the data channel;
    a second reference voltage indicative of a logic LOW signal on the data channel;
    a third reference voltage that is an average of the first reference voltage and the second reference voltage; and
    a comparator structured to compare the present signal on the data channel to the first reference voltage and compare the present signal on the data channel to the third reference voltage in a first operational state, and to compare the present signal on the data channel to the second reference voltage and compare the present signal on the data channel to the third reference voltage in a second operational state.

2. The data detector of claim 1 wherein the comparator comprises:
    a first differential amplifier structured to compare the present signal on the data channel to the first reference voltage; and
    a second differential amplifier structured to compare the present signal on the data channel to the third reference voltage.

3. The data detector of claim 2 wherein the comparator comprises:
    a third differential amplifier structured to compare the present signal on the data channel to the second reference voltage; and
    a fourth differential amplifier structured to compare the present signal on the data channel to the third reference voltage.

4. The data detector of claim 3 wherein the comparator comprises a switch structured to turn on the first differential amplifier and the second differential amplifier when the logic signal at the first input is in a first state, and structured to turn off the first differential amplifier and the second differential amplifier when the logic signal at the first input is in a second state.

5. The data detector of claim 4 wherein the comparator comprises a second switch structured to turn off the third differential amplifier and the fourth differential amplifier when the logic signal at the first input is in the first state, and structured to turn on the third differential amplifier and the fourth differential amplifier when the logic signal at the first input is in the second state.

6. The data detector of claim 1 wherein the comparator is structured to make its comparisons simultaneously.

7. The data detector of claim 6 wherein the particular simultaneous comparison made by the comparator is determined by a signal from the first input.

8. The data detector of claim 1 wherein the comparator is in the first operational state when the logic state that the second data generating device placed on the data channel is a logic HIGH.

9. The data detector of claim 1 wherein the comparator is in the second operational state when the logic state that the second data generating device placed on the data channel is a logic LOW.

10. A data detector for detecting, at a first device coupled to a data channel, data placed on the data channel by a second device, the data channel structured to simultaneously accept data from both the first and second devices, the data detector comprising:
    a first input structured to accept a logic state that the first device placed on the data channel;
    a second input structured to accept a present data state of the data channel; a reference voltage input; and
    a comparator structured to simultaneously compare a signal from the second input to the reference voltage and compare the signal from the second input to a voltage representing a predefined data state on the data channel.

11. The data detector of claim 10 wherein the data channel can be in a HIGH data state, a LOW data state, or a data state approximately midway between the HIGH and LOW data states.

12. The data detector of claim 11 wherein the HIGH data state is represented by a first voltage and wherein the LOW data state is represented by a second voltage.

13. The data detector of claim 12 wherein the comparator comprises:
    a first section structured to simultaneously compare the signal from the second input to the first voltage and to compare the signal from the second input to the reference voltage; and
    a second section structured to simultaneously compare the signal from the second input to the second voltage and to compare the signal from the second input to the reference voltage.

14. The data detector of claim 13 wherein only the first section or the second section of the comparator is active at any given time.

15. The data detector of claim 14 wherein a signal from the first input determines if the first section or the second section of the comparator is active.

16. The data detector of claim 13 wherein the first section of the comparator comprises:
    a first differential amplifier having a first transistor with a gate driven by the reference voltage and having a second transistor with a gate driven by the signal from the second input; and
    a second differential amplifier having a first transistor with a gate driven by the first voltage and having a second transistor with a gate driven by the signal from the second input.

17. The data detector of claim 13 wherein the second section of the comparator comprises:
    a first differential amplifier having a first transistor with a gate driven by the reference voltage and having a second transistor with a gate driven by the signal from the second input; and
    a second differential amplifier having a first transistor with a gate driven by the second voltage and having a second transistor with a gate driven by the signal from the second input.

18. The data detector of claim 12 wherein the reference voltage is a voltage approximately midway between the first and second voltages.

19. A data detection system for detecting data on a bi-directional data channel coupled to a first data generating device and a second generating device, the data detection system comprising:
on the first data generating device:
a first input for accepting a signal of a logic state that the first data generating
device placed on the data channel,
a second input for accepting a present signal on the data channel,
a first reference voltage indicative of a logic HIGH signal on the data channel,
a second reference voltage indicative of a logic LOW signal on the data channel,
a third reference voltage that is an average of the first reference voltage and the second reference voltage, and
a comparator structured to simultaneously compare the present signal on the data channel to the first reference voltage and compare the present signal on the data channel to the third reference voltage in a first operational state, and to simultaneously compare the present signal on the data channel to the second reference voltage and compare the present signal on the data channel to the third reference voltage in a second operational state; and
on the second data generating device:
a first input for accepting a signal of a logic state that the second data generating device placed on the data channel,
a second input for accepting the present signal on the data channel,
the first reference voltage,
the second reference voltage,
the third reference voltage, and
a comparator structured to simultaneously compare the present signal on the data channel to the first reference voltage and compare the present signal on the data channel to the third reference voltage in a first operational state, and to simultaneously compare the present signal on the data channel to the second reference voltage and compare the present signal on the data channel to the third reference voltage in a second operational state.

20. The data detection system of claim 19, wherein each of the comparators comprises:
a first differential amplifier structured to compare the present signal on the data channel to the first reference voltage;
a second differential amplifier structured to compare the present signal on the data channel to the third reference voltage;
a third differential amplifier structured to compare the present signal on the data channel to the second reference voltage; and
a fourth differential amplifier structured to compare the present signal on the data channel to the third reference voltage.

21. The data detection system of claim 20, wherein each of the comparators is structured to enable either the first and second differential amplifiers or the third and fourth differential amplifiers.

22. The data detection system of claim 21 wherein which differential amplifiers are active in the comparator of each respective data generating device is determined by a signal from the first terminal in the respective data generating device.

23. A method for detecting, at a first data generating device coupled to a data channel, data placed on the data channel by a second data generating device, each of the first and second data generating devices structured to simultaneously place data on the data channel, the method comprising:
comparing a present state of the data channel to a predetermined reference voltage, the reference voltage having a value substantially midway between a reference voltage indicating a LOW state of the data channel and a reference voltage indicating a HIGH state of the data channel.

24. The method for detecting data of claim 23, further comprising determining whether to compare the present state of the data channel to either the reference voltage indicating the LOW state of the data channel or the reference voltage indicating the HIGH state of the data channel.

25. The method for detecting data of claim 24 wherein the determination is based on a logic state of data that the first data generating device placed on the data channel.

26. The method of claim 25, further comprising, when the present state of the data channel is to be compared to the reference voltage indicating the HIGH state of the data channel:
enabling a first portion of the comparator based on a HIGH logic state of data that the first data generating device placed on the data channel; and
simultaneously comparing the present state of the data channel to the predetermined reference voltage and comparing the present state of the data channel to the reference voltage indicating the HIGH state of the data channel.

27. The method of claim 25, further comprising, when the present state of the data channel is to be compared to the reference voltage indicating the LOW state of the data channel:
enabling a second portion of the comparator based on a LOW logic state of data that the first data generating device placed on the data channel; and
simultaneously comparing the present state of the data channel to the predetermined reference voltage and comparing the present state of the data channel to the reference voltage indicating the LOW state of the data channel.

28. The method for detecting data of claim 23, wherein the comparisons of the present state of the data channel occur simultaneously.

29. In a system having two data generating devices coupled to a bi-directional data channel, the data channel structured to have data placed on it simultaneously by the two data generating devices, a method for determining, at a first of the data generating devices, data placed on the data channel by a second of the generating devices, the method comprising:
determining a logic state of data placed on the data channel by the first data generating device;
comparing a present state of the data channel to a first reference voltage that is approximately equal to a voltage that the data channel would be if both the first and second data generating devices placed data having dissimilar logic states on the data channel; and
comparing the present state of the data channel to either a second reference voltage or a third reference voltage.

30. The method of claim 29 wherein comparing the present state of the data channel to an additional reference voltage comprises:

comparing the present state of the data channel to a second reference voltage equal to a voltage the data channel would be if both the first and second data generating devices placed data having a HIGH logic state on the data channel; or comparing the present state of the data channel to a third reference voltage equal to a voltage the data channel would be if both the first and second data generating devices placed data having a LOW logic state on the data channel.

31. The method of claim 30 wherein the present state of the data channel is compared to the second reference voltage or to the third reference voltage based on the logic state of data placed on the data channel by the first data generating device.

32. A data detector for detecting data placed on a bi-directional data channel by a first data generating device, the data detector comprising:

a first input for accepting a signal of a logic state that a second data generating device placed on the data channel;

a second input for accepting a present signal on the data channel;

a first reference voltage indicative of a logic HIGH signal on the data channel;

a second reference voltage indicative of a logic LOW signal on the data channel;

a third reference voltage that is an average of the first reference voltage and the second reference voltage; and a comparator structured to compare the present signal on the data channel to the first reference voltage and compare the present signal on the data channel to the third reference voltage, or to compare the present signal on the data channel to the second reference voltage and compare the present signal on the data channel to the third reference voltage, the comparator including:

a first differential amplifier structured to compare the present signal on the data channel to the first reference voltage; and a second differential amplifier structured to compare the present signal on the data channel to the third reference voltage.

33. The data detector of claim 32 wherein the comparator comprises:

a third differential amplifier structured to compare the present signal on the data channel to the second reference voltage; and a fourth differential amplifier structured to compare the present signal on the data channel to the third reference voltage.

34. The data detector of claim 33 wherein the comparator comprises a switch structured to turn on the first differential amplifier and the second differential amplifier when the logic signal at the first input is in a first state, and structured to turn off the first differential amplifier and the second differential amplifier when the logic signal at the first input is in a second state.

35. The data detector of claim 34 wherein the comparator comprises a second switch structured to turn off the third differential amplifier and the fourth differential amplifier when the logic signal at the first input is in the first state, and structured to turn on the third differential amplifier and the fourth differential amplifier when the logic signal at the first input is in the second state.

36. A data detector for detecting, at a first device coupled to a data channel, data placed on the data channel by a second device, the data channel structured to simultaneously accept data from both the first and second devices, the data detector comprising:

a first input structured to accept a logic state that the first device placed on the data channel, wherein the data channel can be in a HIGH data state represented by a first voltage, a LOW data state represented by a second voltage, or a data state approximately midway between the HIGH and LOW data states;

a second input structured to accept a present data state of the data channel;

a reference voltage input; and a comparator structured to simultaneously compare a signal from the second input to the reference voltage wherein the comparator is activated according to a voltage representing the logic state that the first device placed on the data channel, the comparator including:

a first section structured to simultaneously compare the signal from the second input to the first voltage and to compare the signal from the second input to the reference voltage, the first section including:

a first differential amplifier having a first transistor with a gate driven by the reference voltage and having a second transistor with a gate driven by the signal from the second input; and a second differential amplifier having a first transistor with a gate driven by the first voltage and having a second transistor with a gate driven by the signal from the second input; and a second section structured to simultaneously compare the signal from the second input to the second voltage and to compare the signal from the second input to the reference voltage.

37. A data detector for detecting, at a first device coupled to a data channel, data placed on the data channel by a second device, the data channel structured to simultaneously accept data from both the first and second devices, the data detector comprising:

a first input structured to accept a logic state that the first device placed on the data channel, wherein the data channel can be in a HIGH data state represented by a first voltage, a LOW data state represented by a second voltage, or a data state approximately midway between the HIGH and LOW data states;

a second input structured to accept a present data state of the data channel; a reference voltage input; and a comparator structured to simultaneously compare a signal from the second input to the reference voltage wherein the comparator is activated according to a voltage representing the logic state that the first device placed on the data channel, the comparator including:

a first section structured to simultaneously compare the signal from the second input to the first voltage and to compare the signal from the second input to the reference voltage; and a second section structured to simultaneously compare the signal from the second input to the second voltage and to compare the signal from the second input to the reference voltage, the second section including:

a first differential amplifier having a first transistor with a gate driven by the reference voltage and having a second transistor with a gate driven by the signal from the second input; and a second differential amplifier having a first transistor with a gate driven by the second voltage and having a second transistor with a gate driven by the signal from the second input.

38. A data detection system for detecting data on a bi-directional data channel coupled to a first data generating device and a second generating device, the data detection system comprising:

on the first data generating device:
a first input for accepting a signal of a logic state that the first data generating device placed on the data channel,
a second input for accepting a present signal on the data channel,
a first reference voltage indicative of a logic HIGH signal on the data channel,
a second reference voltage indicative of a logic LOW signal on the data channel,
a third reference voltage that is an average of the first reference voltage and the second reference voltage, and
a comparator structured to simultaneously compare the present signal on the data channel to the first reference voltage and compare the present signal on the data channel to the third reference voltage, or to simultaneously compare the present signal on the data channel to the second reference voltage and compare the present signal on the data channel to the third reference voltage; and on the second data generating device:
a first input for accepting a signal of a logic state that the second data generating device placed on the data channel,
a second input for accepting the present signal on the data channel,
the first reference voltage,
the second reference voltage,
the third reference voltage, and
a comparator structured to simultaneously compare the present signal on the data channel to the first reference voltage and compare the present signal on the data channel to the third reference voltage, or to simultaneously compare the present signal on the data channel to the second reference voltage and compare the present signal on the data channel to the third reference voltage;

wherein each of the comparators of the first and second generating devices includes:
a first differential amplifier structured to compare the present signal on the data channel to the first reference voltage;
a second differential amplifier structured to compare the present signal on the data channel to the third reference voltage;
a third differential amplifier structured to compare the present signal on the data channel to the second reference voltage; and
a fourth differential amplifier structured to compare the present signal on the data channel to the third reference voltage.

39. The data detection system of claim 38, wherein each of the comparators is structured to enable either the first and second differential amplifiers or the third and fourth differential amplifiers.

40. The data detection system of claim 39 wherein which differential amplifiers are active in the comparator of each respective data generating device is determined by a signal from the first terminal in the respective data generating device.

* * * * *